(12) United States Patent
Moss et al.

(10) Patent No.: US 9,193,393 B2
(45) Date of Patent: Nov. 24, 2015

(54) FULL HEIGHT TUNNEL SECTION WITH ENCLOSED EXHAUST

(71) Applicant: GM Global Technology Operations LLC, Detroit, MI (US)

(72) Inventors: Edward D. Moss, Commerce Township, MI (US); Robert N. Saje, Shelby Township, MI (US); Giles D. Bryer, Northville, MI (US); Peter M. Parlow, Columbus, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/323,409

(22) Filed: Jul. 3, 2014

(65) Prior Publication Data

US 2015/0021894 A1    Jan. 22, 2015

Related U.S. Application Data

(60) Provisional application No. 61/857,120, filed on Jul. 22, 2013.

(51) Int. Cl.
*B62D 25/20*    (2006.01)

(52) U.S. Cl.
CPC ............ *B62D 25/20* (2013.01); *B62D 25/2027* (2013.01)

(58) Field of Classification Search
CPC ........................... B62D 25/20; B62D 25/2027
See application file for complete search history.

(56) References Cited

U.S. PATENT DOCUMENTS

| 5,102,187 | A  | * | 4/1992  | Harasaki  | 296/204    |
|-----------|----|---|---------|-----------|------------|
| 5,988,734 | A  |   | 11/1999 | Longo et al. |         |
| 2008/0007089 | A1 | * | 1/2008 | Bachmann | 296/187.08 |
| 2008/0169038 | A1 | * | 7/2008 | Sellis et al. | 138/149 |
| 2013/0038090 | A1 | * | 2/2013 | Hwang et al. | 296/193.07 |

* cited by examiner

*Primary Examiner* — Faye M Fleming
(74) *Attorney, Agent, or Firm* — BrooksGroup

(57) ABSTRACT

One variation may include a vehicle center tunnel which may include an enclosed exhaust system.

20 Claims, 5 Drawing Sheets

FULL HEIGHT TUNNEL SECTION WITH ENCLOSED EXHAUST

CROSS-REFERENCE TO RELATED APPLICATIONS

This application claims the benefit of U.S. Provisional Application No. 61/857,120 filed Jul. 22, 2013.

TECHNICAL FIELD

The field to which the disclosure generally relates to includes vehicle frame structures.

BACKGROUND

A vehicle may include a frame structure.

SUMMARY OF ILLUSTRATIVE VARIATIONS

One variation may include a product comprising: a tunnel structure, comprising a top surface; a first and a second side wall, wherein the first and the second side wall each extend downward from the top surface; a first and a second upper longitudinal section which each extend horizontally along a first and a second top corner of the tunnel structure; and a first and a second lower longitudinal section which each extend horizontally along a first and a second bottom corner of the tunnel structure.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

In a number of variations, a vehicle may include a longitudinal tunnel or center tunnel structure which may extend along the length of the occupant compartment. The center tunnel structure may be constructed and arranged to provide additional torsional and bending stiffness to the vehicle body including, but not limited to, vehicle bodies having an open roof.

Figure 1:
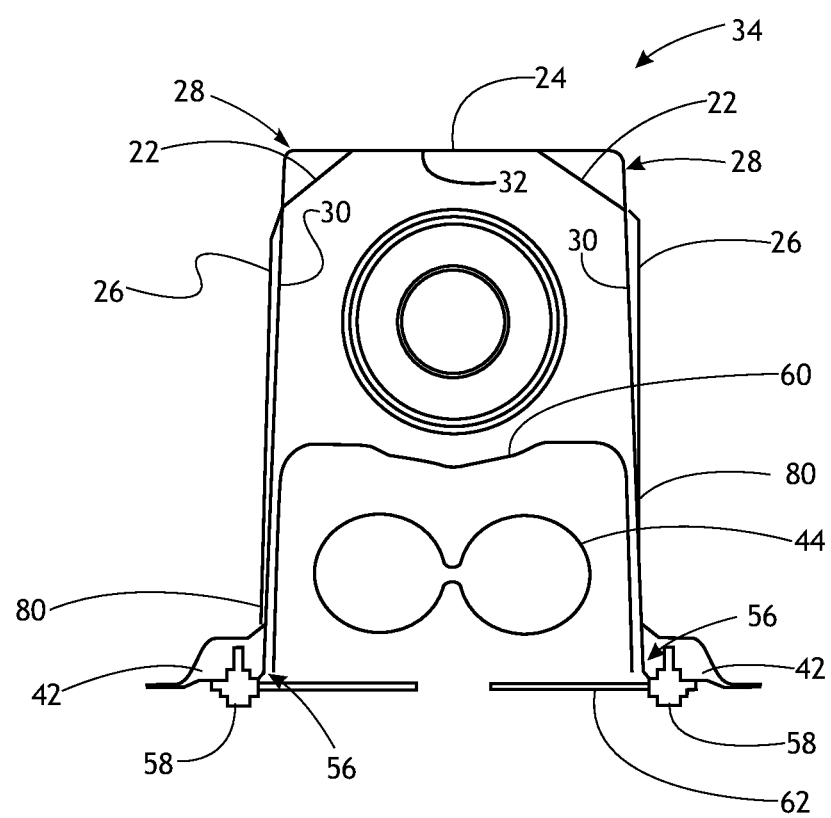
FIG. 1 illustrates a sectional view of a center tunnel having an enclosed exhaust system according to a number of variations.
Figure 6:
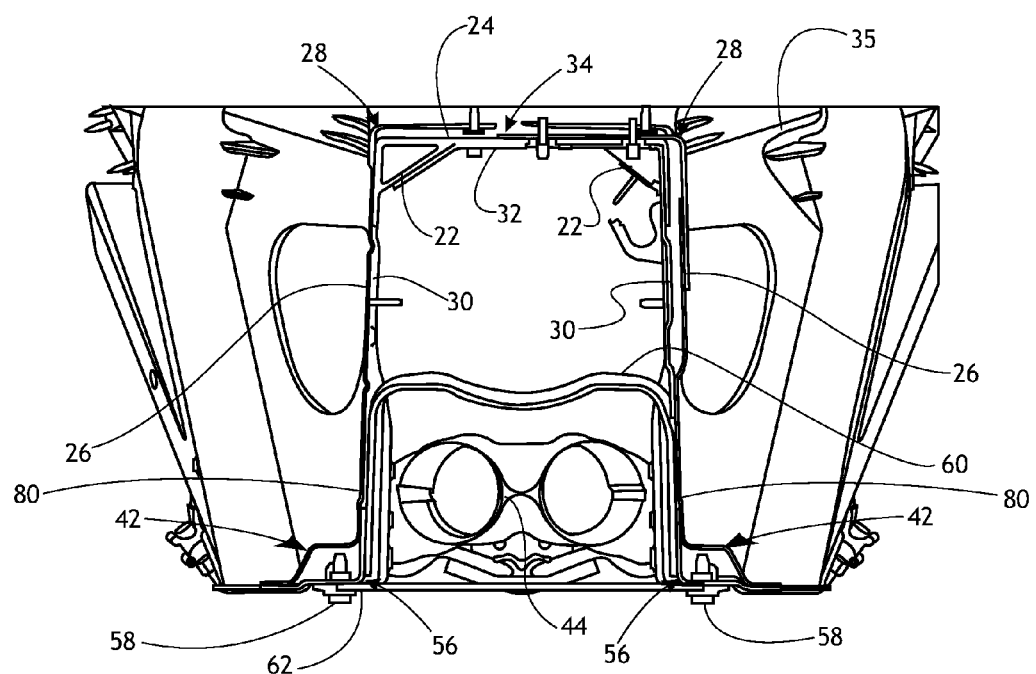
FIG. 6 illustrates a sectional view of a center tunnel, exhaust system, and close-out panel according to a number of variations.
Figure 7:
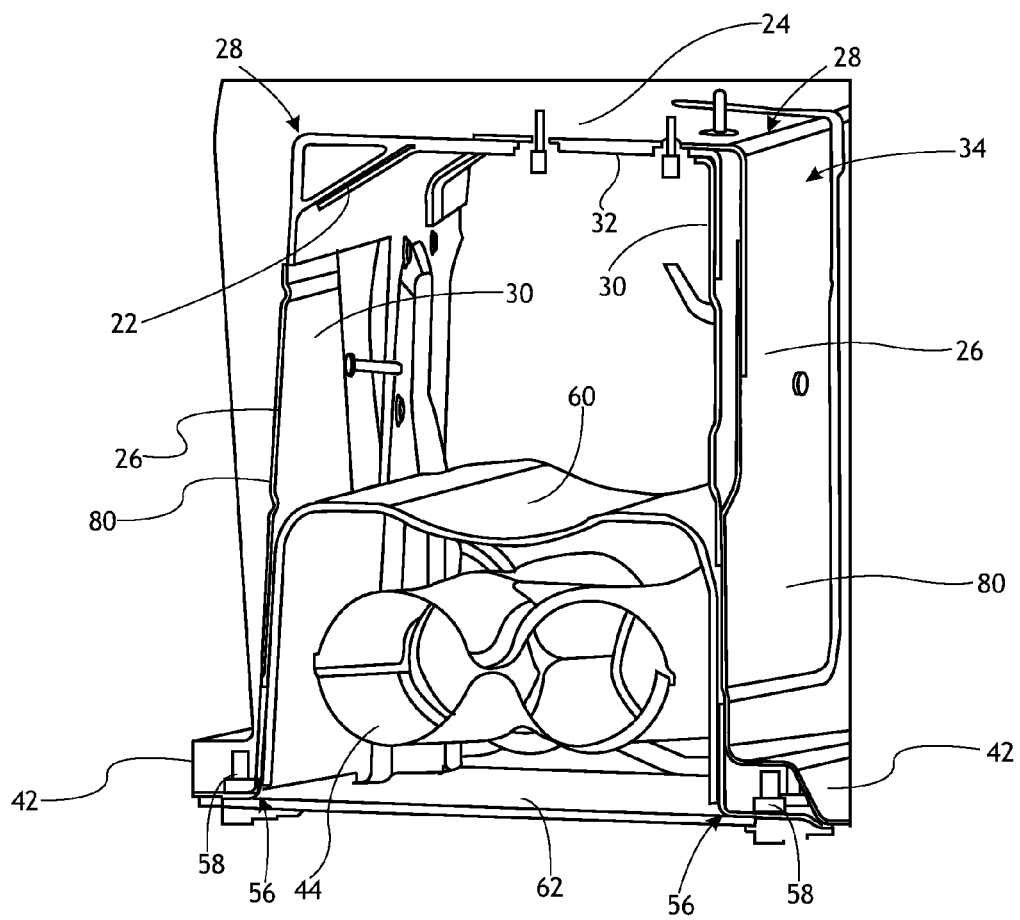
FIG. 7 illustrates a prospective sectional view of a center tunnel, exhaust system, and close-out panel according to a number of variations.

Referring to FIGS. 1, 6 and 7, in any of a number of variations, a center tunnel structure 34 may include a top surface 24 which may be substantially planar and may also include two side walls 26 which may be substantially planar and which may extend downward from the top surface 24. The center tunnel structure 34 may include upper longitudinal sections 22 at each of its top corners 28. The upper longitudinal sections 22 may extend from the inner surface 30 of each of the side walls 26 to the underside 32 of the top structure 24 at an angle, and may each extend horizontally along the length of the tunnel structure 34. The upper longitudinal sections 22 may be constructed and arranged to provide increased torsional and bending stiffness to the center of the vehicle.

In a number of variations, the center tunnel structure 34 may also include lower longitudinal sections 42 which may be located at each of the lower corners 56 of the center tunnel structure 34. The lower longitudinal sections 42 may extend from the outer surface 80 of each of the side walls 26 and may form a triangular-like shape and may extend horizontally along the length of the center tunnel structure 34. The lower longitudinal sections 42 may be constructed and arranged to provide increased torsional and bending stiffness to the center of the vehicle. The lower longitudinal sections 42 may also be constructed and arranged to accommodate structural hardware 58 including, but not limited to, one or more mechanical fasteners such as bolts. The structural hardware 58 in the lower longitudinal sections 42 may be used to attach the lower longitudinal sections 42 to the bottom close-out panel 62, as will be discussed hereafter.

In a number of variations, an exhaust system 44 may be located above the bottom close-out panel 62 and within the center tunnel structure 34, variations of which are illustrated in FIGS. 1-7. In a number of variations, an exhaust shield 60 may be positioned above the exhaust system 44 which may prevent or reduce heat which may exist from the exhaust system 44 from entering into the passenger compartment of the vehicle.

Figure 2:
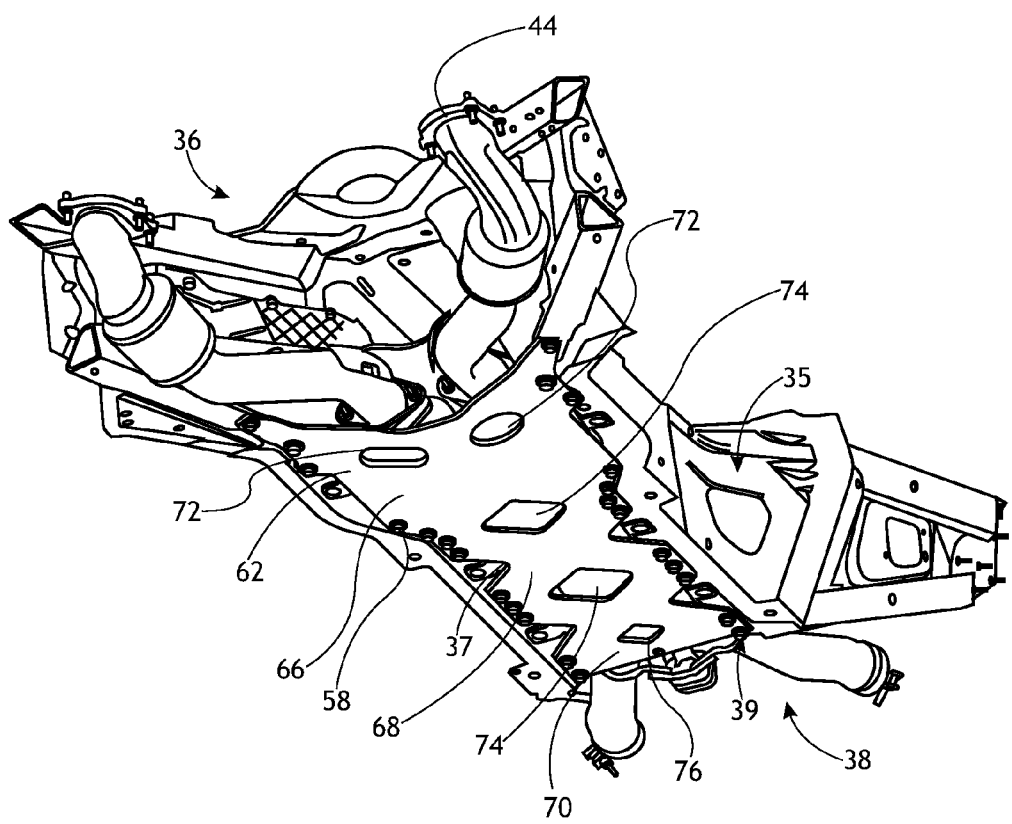
FIG. 2 illustrates a prospective view of a vehicle underbody according to a number of variations.
Figure 3:
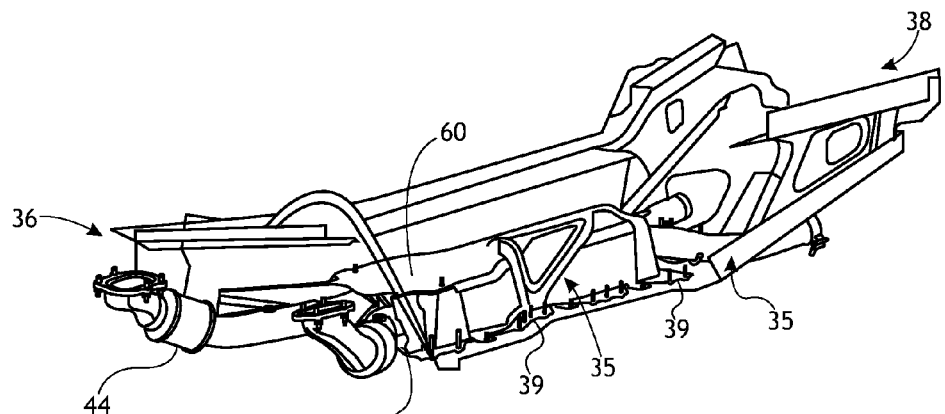
FIG. 3 illustrates a prospective side view of a center tunnel having an enclosed exhaust system according to a number of variations.
Figure 4:
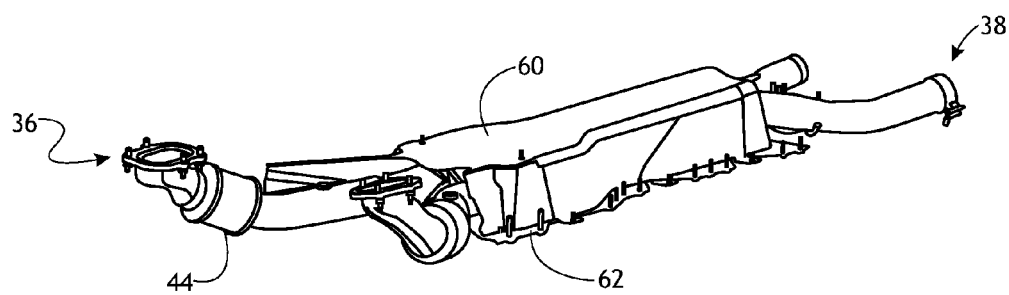
FIG. 4 illustrates a prospective side view of an exhaust shield, an exhaust system, and close-out panel according to a number of variations.
Figure 5:
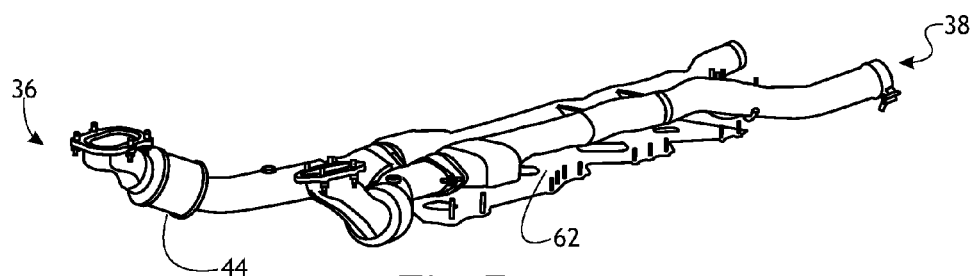
FIG. 5 illustrates a prospective side view of an exhaust system and close-out panel according to a number of variations.

In any of a number of variations, a bottom close-out panel 62 may be constructed and arranged to attach to the lower longitudinal sections 42, variations of which are illustrated in FIGS. 1 and 6-7. In a number of variations, the bottom close-out panel 62 may also be attached to one or more truss structures 35 which may work together with the bottom close-out panel 62 to distribute various load paths which may increase stability in the center of the vehicle. The bottom close-out panel 62 may include a trussing pattern which may include a series of connected truss beams 37 or load paths which may be constructed and arranged to distribute one or more lateral loads, a variation of which is illustrated in FIG. 2. Ends 39 of the truss beams 37 may be aligned and/or connected to the truss structures 35. In a number of variations, the ends 39 of the truss beams 37 may be connected to the truss structures 35 by screws such as flow drill screws or other fasteners. The bottom close-out panel 62 may also include one or more openings 72, 74, 76 which may act as a venting system to prevent or reduce heat which may exist from the exhaust system 44 from entering into the passenger compartment of the vehicle. In one variation, the bottom close-out panel 62 may increase in width as it extends from the rear 38 of the vehicle to the front 36 of the vehicle. The bottom close-out panel 62 may include a front portion 66, a middle portion 68, and a rear portion 70. The front portion 66 may include two cutouts 72 having any of a variety of shapes including, but not limited to, an oval or circular shape. The front portion 66 may have a width larger than the middle and rear portions 68, 70. The middle portion 68 may include a double hexagonal-like shape which may include a cutout 74 approximately center of each hexagonal-like shape. The rear portion 70 may form a triangular-like shape which may include a cutout 76 in any of a variety of shapes including, but not limited to, a diamond shape, which may be located approximately central of the rear portion 70. The bottom close-out panel 62 may be formed in any of a variety of ways including, but not limited to stamping and laser cutting.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a tunnel structure, comprising a top surface; a first and a second side wall, wherein the first and the second side wall each extend downward from the top surface; a first and a second upper longitudinal section which each extend horizontally along a first and a second top corner of the tunnel structure; and a first and a second lower longitudinal section which each extend horizontally along a first and a second bottom corner of the tunnel structure.

Variation 2 may include a product as set forth in Variation 1 wherein the upper longitudinal sections and the lower longitudinal sections are constructed and arranged to increase torsional stiffness of a center of a vehicle.

Variation 3 may include a product as set forth in any of Variations 1 and 2 wherein the upper longitudinal sections and the lower longitudinal sections are constructed and arranged to increase bending stiffness of a center of a vehicle.

Variation 4 may include a product as set forth in any of Variations 1-3 wherein the first upper longitudinal section extends from an inner surface of the first wall to an underside of the top surface and wherein the second upper longitudinal section extends from an inner surface of the second side wall to the underside of the top surface and wherein the first lower longitudinal section extends from an outer surface of the first side wall and is constructed and arranged to attach to a close-out panel and wherein the second lower longitudinal section extends from an outer surface of the second side wall and is constructed and arranged to attach to the close-out panel.

Variation 5 may include a product as set forth in any of Variations 1-4 wherein the lower longitudinal sections are constructed and arranged to accommodate structural hardware to attach to a close-out panel.

Variation 6 may include a product as set forth in any of Variations 1-5 further comprising a close-out panel attached to the lower longitudinal sections.

Variation 7 may include a product as set forth in Variation 6 wherein the lower longitudinal sections are attached to the close-out panel via a plurality of mechanical fasteners.

Variation 8 may include a product as set forth in any of Variations 6-7 further comprising an exhaust system located within the tunnel structure and above the close-out panel.

Variation 9 may include a product as set forth in Variation 8 further comprising an exhaust shield located above the exhaust system which is constructed and arranged to reduce heat from entering into an occupant compartment.

Variation 10 may include a product as set forth in any of Variations 6-9 wherein the close-out panel includes a plurality of openings.

Variation 11 may include a product as set forth in Variation 10 wherein the plurality of openings are constructed and arranged to vent heat from an exhaust system.

Variation 12 may include a product as set forth in any of Variations 6-11 wherein the close-out panel includes a series of connected load paths which are constructed and arranged to provide torsional stiffness to a center of a vehicle.

Variation 13 may include a product as set forth in any of Variations 6-12 wherein the close out panel is stamped and laser cut.

Variation 14 may include a product as set forth in any of Variations 6-13 wherein the close-out panel is attached to a trussing system having a plurality of load paths which are constructed and arranged to distribute a plurality of loads to increase torsional stiffness of a center of a vehicle.

Variation 15 may include a product comprising: a vehicle center tunnel comprising: a tunnel structure, comprising a top surface and a first and a second side wall which extend downward from the top surface; a first and a second upper longitudinal section which extend horizontally along a first and a second top corner of the tunnel structure; a first and a second lower longitudinal section which extend horizontally along a first and a second bottom corner of the tunnel structure; a close-out panel attached to the first and the second lower longitudinal sections; and an exhaust system located above the close-out panel and within the tunnel structure.

Variation 16 may include a product as set forth in Variation 15 further comprising an exhaust shield located above the exhaust system.

Variation 17 may include a method comprising: improving the torsional and bending stiffness of a center of a vehicle comprising: providing a center tunnel comprising a first and a second upper longitudinal section and a first and a second lower longitudinal section; providing an exhaust system within the center tunnel; and attaching a tunnel close-out panel to the first and the second lower longitudinal sections and enclosing at least a portion of the exhaust system.

Variation 18 may include a method as set forth in Variation 17 wherein the first and the second upper longitudinal sections are located at each of the top corners of the center tunnel and the first and the second lower longitudinal sections are located at each of the bottom corners of the center tunnel.

Variation 19 may include a method as set forth in any of Variations 17-18 further comprising an exhaust shield located above the exhaust system which is constructed and arranged to reduce heat from entering an occupant compartment of a vehicle.

Variation 20 may include a product comprising a close-out panel for a vehicle tunnel, the close-out panel comprising a truss system having a plurality of openings formed therein defined by a plurality of intersecting truss beams.

The above description of select variations within the scope of the invention is merely illustrative in nature and, thus, variations or variants thereof are not to be regarded as a departure from the spirit and scope of the invention.

What is claimed is:
1. A product comprising:
a tunnel structure comprising: a top surface;
a first side wall and a second side wall, wherein the first and the second side wall each extend downward from the top surface;

a first upper longitudinal section which extends at a first angle from a first inner surface of the first side wall to an underside of the top surface to form a first triangular section at a first top corner of the tunnel structure and which extends horizontally along the first top corner, a second upper longitudinal section which extends at a second angle from a second inner surface of the second side wall to the underside of the top surface to form a second triangular section at a second top corner and which extends horizontally along the second top corner of the tunnel structure; and a first and a second lower longitudinal section which each extend horizontally along a first and a second bottom corner of the tunnel structure.

2. The product of claim 1 wherein the first and the second upper longitudinal section and the first and the second lower longitudinal section are constructed and arranged to increase torsional stiffness of a center of a vehicle.

3. The product of claim 1 wherein the first and the second upper longitudinal section and the first and the second lower longitudinal section are constructed and arranged to increase bending stiffness of a center of a vehicle.

4. The product of claim 1 wherein the first lower longitudinal section extends from an outer surface of the first side wall and is constructed and arranged to attach to a close-out panel, and wherein the second lower longitudinal section extends from an outer surface of the second side wall and is constructed and arranged to attach to the close-out panel.

5. The product of claim 1 wherein the first and the second lower longitudinal section are constructed and arranged to accommodate structural hardware to attach to a close-out panel.

6. The product of claim 1 further comprising a close-out panel attached to the first and the second lower longitudinal section.

7. The product of claim 6 wherein the first and the second lower longitudinal section are attached to the close-out panel via a plurality of mechanical fasteners.

8. The product of claim 6 further comprising an exhaust system located within the tunnel structure and above the close-out panel.

9. The product of claim 8 further comprising an exhaust shield located above the exhaust system which is constructed and arranged to reduce heat from entering into an occupant compartment.

10. The product of claim 6 wherein the close-out panel includes a plurality of openings.

11. The product of claim 6 wherein the close-out panel includes a series of connected load paths which are constructed and arranged to provide torsional stiffness to a center of a vehicle.

12. The product of claim 6 wherein the close out panel is stamped and laser cut.

13. The product of claim 6 wherein the close-out panel is attached to a trussing system having a plurality of load paths which are constructed and arranged to distribute a plurality of loads to increase torsional stiffness of a center of a vehicle.

14. A product comprising:
a vehicle center tunnel comprising:
a tunnel structure, comprising a top surface and a first and a second side wall which extend downward from the top surface;
a first and a second upper longitudinal section which extend horizontally along a first and a second top corner of the tunnel structure and which each have a triangular cross section;
a first and a second lower longitudinal section which extend horizontally along a first and a second bottom corner of the tunnel structure;
a close-out panel attached to the first and the second lower longitudinal sections; and
an exhaust system located above the close-out panel and within the tunnel structure.

15. The product of claim 14 further comprising an exhaust shield located above the exhaust system.

16. A method comprising:
improving the torsional and bending stiffness of a center of a vehicle comprising:
providing a center tunnel comprising a first and a second upper longitudinal section and a first and a second lower longitudinal section each having a triangular cross section;
providing an exhaust system within the center tunnel; and
attaching a tunnel close-out panel to the first and the second lower longitudinal sections and enclosing at least a portion of the exhaust system.

17. The method of claim 16 wherein the first and the second upper longitudinal sections are located at each of the top corners of the center tunnel and the first and the second lower longitudinal sections are located at each of the bottom corners of the center tunnel.

18. The method of claim 16 further comprising an exhaust shield located above the exhaust system which is constructed and arranged to reduce heat from entering an occupant compartment of a vehicle.

19. A product comprising a close-out panel for a vehicle tunnel, the close-out panel comprising a truss system having a plurality of openings formed therein defined by a plurality of intersecting truss beams.

20. A product comprising:
a tunnel structure, comprising a top surface;
a first and a second side wall, wherein the first and the second side wall each extend downward from the top surface;
a first and a second upper longitudinal section which each extend horizontally along a first and a second top corner of the tunnel structure;
a first and a second lower longitudinal section which each extend horizontally along a first and a second bottom corner of the tunnel structure; and
a close-out panel attached to the first and the second lower longitudinal sections, wherein the close-out panel includes a plurality of openings, and wherein the plurality of openings are constructed and arranged to vent heat from an exhaust system.

* * * * *